United States Patent [19]

Pascher

[11] Patent Number: 4,759,602
[45] Date of Patent: Jul. 26, 1988

[54] METHOD OF MANUFACTURING AN OPTICAL TRANSMISSION ELEMENT

[75] Inventor: Helmut Pascher, Munich, Fed. Rep. of Germany

[73] Assignee: Siemens Aktiengesellschaft, Berlin and Munich, Fed. Rep. of Germany

[21] Appl. No.: 351,544

[22] Filed: Feb. 23, 1982

[30] Foreign Application Priority Data

Mar. 12, 1981 [DE] Fed. Rep. of Germany ....... 3109469

[51] Int. Cl.⁴ ............................................... G02B 6/44
[52] U.S. Cl. ................................................... 350/96.23
[58] Field of Search ....................................... 350/96.23

[56] References Cited

U.S. PATENT DOCUMENTS 4,129,468 12/1978 Knob ................................. 350/96.23
4,172,106 10/1979 Lewis ................................. 350/96.23
4,178,069 12/1979 Anderson et al. ................ 350/96.23
4,388,800 6/1983 Trezequet et al. ................ 350/96.23
4,389,088 6/1983 Trezequet ......................... 350/96.23

Primary Examiner—William L. Sikes
Assistant Examiner—Robert E. Wise
Attorney, Agent, or Firm—Hill, Van Santen, Steadman & Simpson

[57] ABSTRACT

A method of manufacturing an elongated optical transmission element having a tubular protective sheathing or tube containing at least one fiber-like light waveguide which has a form of a helix. The method includes subjecting each of the waveguides or the combination of waveguides to an elastic pre-torsion while they are introduced into the protective sheathing or tube which is preferably formed by extruding.

14 Claims, 1 Drawing Sheet

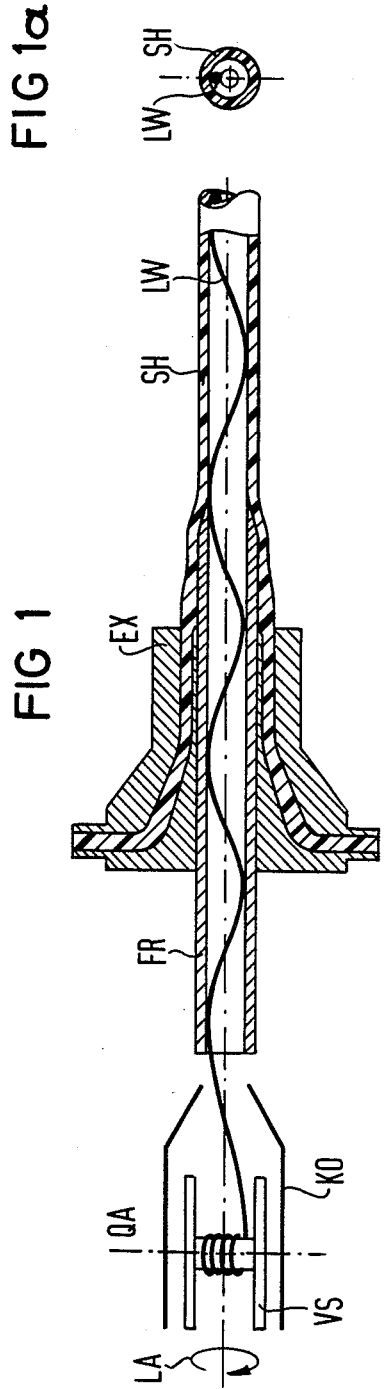
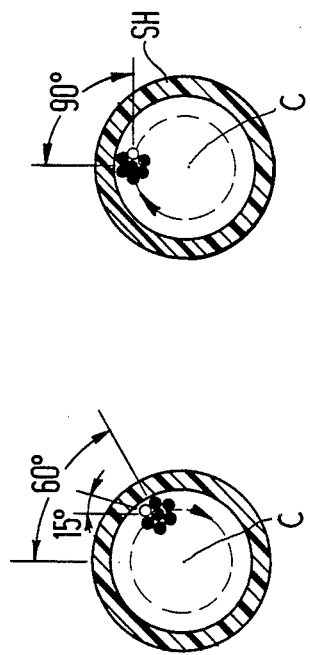
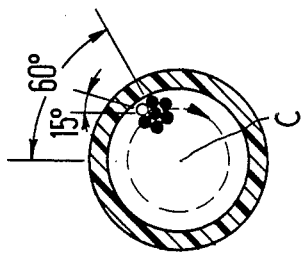
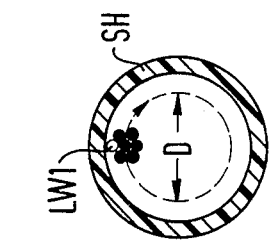

METHOD OF MANUFACTURING AN OPTICAL TRANSMISSION ELEMENT

BACKGROUND OF THE INVENTION

The present invention is directed to a method for manufacturing an elongated optical transmission element comprising a tubular protective sheathing having at least one fiber-like light waveguide which has a form of a helix introduced therein.

A method of producing an elongated optical transmission element, which has a tubular protective sheathing receiving at least one fiber-like waveguide or optical fiber which has the form of a helix, is disclosed in German O.S. No. 27 01 704. In the method disclosed in this reference, the optical fiber itself or if it has a coating, the coating of the optical fiber is deformed so that the fiber has a permanently spiral-like arrangement. However, such a permanent deformation of the waveguide has several disadvantages. For example, it causes a possible diminution of the transmission properties of the fiber-like light waveguide. Moreover, the cost for producing such a permanent deformation is relatively high, and the method which is utilized to provide the permanent deformation is complicated and hard to manipulate.

SUMMARY OF THE INVENTION

The object of the present invention is directed to guaranteeing a spiral-like course for each of the fiber-like waveguides which are received in a tubular protective sheath and is achieved in a simple manner.

To accomplish these goals the present invention is directed to an improvement in a method of manufacturing an elongated optical transmission element having a tubular protective sheathing or tube containing at least one fiber-like light waveguide which has a form of a helix, said method including introducing each of the light waveguides into the inside of the tubular protective sheathing while in the form of an helix. The improvement comprise subjecting each waveguide to an elastic pre-torsion when introducing it into the protective sheathing.

By means of applying an elastic pre-torsion or pre-twist to the light waveguide, the light waveguide will experience no deformation and if it is a coated light waveguide, its protective coating will experience no deformation. Nonetheless, the waveguide will be received spirally inside of the tubular protective sheathing or casing whereby its elastic properties are fully retained. Thus, deformation of the sheath, for example, the bending or stretching of the protective sheathing or of the optical cable containing it, will not produce inadmissibly high mechanical loads on the optical fibers.

Another advantage occurs during splicing. In a transmission element, which is contained in the optical cable as a result of the elasticity of the pre-torsion, the fiber-like light waveguide will immediately spring out to a certain degree as soon as the protective sheathing or jacket is cut. Thus, an excess length, which is required for splicing is offered. This is particularly true when the protective sheathing is only filled with air or with a very soft or fluid agent.

BRIEF DESCRIPTION OF THE DRAWINGS

FIG. 1 is a schematic illustration in cross-section of an apparatus for executing the inventive method;

FIG. 1a is a cross-section of the elongated transmission element provided in FIG. 1; and FIGS. 2 through 4 are cross-sections through the optical transmission element having a bundle of light waveguides taken in different positions along the length of the element.

DESCRIPTION OF THE PREFERRED EMBODIMENTS

The principles of the present invention are particularly useful in a method for inserting a single light waveguide LW into the interior of the protective sheathing or jacket SH, as illustrated in FIGS. 1 and 1a. While the Figures only illustrates a single light waveguide, it is also possible to provide more than one light waveguide. If more than one light waveguide is being inserted, the waveguides can be either a bundle of waveguides or stranded together waveguides and can be wound on a common reel. It is also possible for the separate waveguides to be wound on separate reels, which separate reels are stationarily disposed relative to one another. As illustrated, a light waveguide such as LW is provided with a protective coating and is wound onto a supply reel VS which is accommodated in a cage or yoke KO. When the light waveguide LW is taken off, the yoke or cage KO is rotated around the longitudinal axis as indicated by the arrow LA in such a manner that no 100% back-twist will occur but rather only a partial back-twist is applied to the waveguide. By so doing, a residual torsion is retained which is transmitted to the light waveguide LW and causes it to assume an approximately helical or spiral configuration.

In order to retain this configuration and guide it into the desired paths, a guidance tube FR is provided directly adjacent to the cage or yoke KO. The guidance tube FR has an inside diameter which is approximately the same as the inside diameter of the protective sheathing SH of the optical transmission element and restrain the waveguide until it is inserted into the sheath. The guidance tube is positioned relative to a device EX which serves for producing the protective sheathing SH. In the present example, the tubing SH is formed in the extruder EX which first extrudes the protective sheathing in a plastic state in a hose drawing method. Subsequently this is drawn down to the final diameter and is cooled. The light waveguide LW proceeds spirally inside of the protective sheathing and thus continuously presses against the inside wall of the protective sheathing SH. It should be noted that while the above description is dealing with a single waveguide LW, one or more waveguides could be utilized.

FIGS. 2, 3 and 4, show cross-sections through a protective sheath SH along different locations of the transmission element and it is noted that a plurality of, for example, seven light waveguides were introduced in a common and in a tight proximity to each other into the protective sheathing SH. In the following, these seven waveguides will be referred to as a bundle or cable.

Just like every individual conductor, the center line of the bundle lies on a spiral within the protective sheathing SH. The orientation of the individual light waveguides relative to one another is retained along the transmission element. The orientation of the overall bundle, which is symbolized in FIGS. 2, 3 and 4 by the conductor LW1, which is a white circle, thereby turns from FIG. 2 through FIG. 4 by x% of a full rotation towards the right over the path of a length of the lay, whereas the center of the bundle rotates by a full rotation towards the right around the center point or axis C of the cross-section of the protective sheathing. In other words, the back-twist of the bundle amounts to $(100-x)$ %. For the purpose of a clear illustration in the drawings, the amount for x has been selected to be $x=25\%$. However, in reality, the actual value will remain significantly below this value of 25%. As illustrated in FIGS. 2–4, the FIG. 3 is a state which is to be spatially classified between the cross-sectional views of FIGS. 2 and 4.

Deriving therefrom for the practical execution of the method as already mentioned above, the simplification is that the bundle can be drawn off or taken either from one common reel or from a plurality of separate reels which are rigidly housed in a rotatable cage or yoke.

Given a common reel, an overhead haul-off along the axis of the reel with the reel being stationary can also be employed instead of accommodating the reel in a rotatable yoke as illustrated in FIG. 1. The precondition for all specified alternatives of the method is that no additional stranding elements such as a filler braid is situated within the stranding circle in the center of the protecting sheath.

The length L of the spiral with a diameter D (FIG. 2) and the pitch H, which is the length of the lay, is derived from the following equation.

$$\frac{L}{H} = \frac{\sqrt{H^2 + (\pi D)^2}}{H} = \sqrt{1 + \left(\frac{D}{H}\right)^2} \approx 1 + \frac{1}{2}\left(\frac{\pi D}{H}\right)^2 \tag{1}$$

In the relationship above, excess length of the spiral in comparison to its axis thus amounts to $(\pi D/H)^2/2$.

A light waveguide laid along a helical line is situated in the state of minimum torsion energy when the back-twist $\rho$ per pitch, expressed in the radian measure, is selected according to the following relationship or equation:

$$\rho = 2\pi \cdot \frac{H}{H^2 + (\pi D)^2} \approx 2\left[1\frac{1}{2}\left(\frac{\pi D}{H}\right)^2\right] \tag{2}$$

This relationship is known from armoring technology that is utilized for submarine cables. According to equations (1) and (2), the fraction of the back-twist lacking for 100% is equal in a close approximation to the relative excess length of the helix in comparison to axial length. So that the light waveguides relatively and easily lay in the desired helical line, it is expedient to adjust the residual torsion to be larger by a multiple in comparison to the ideal back-twist $(\pi D/H)^2/2$. On the other hand, in practice, one will likewise not exceed the magnitude of 10% so as not to allow the torsional load of the light waveguide to become to great. These limits can be easily observed in practice, because the relative fiber excess length is generally selected between 0.1 and 1% in order to make do on one hand and to have a bearable outlay for the tensile reinforcement and, on the other hand, to have not too great a stranding diameter.

In manufacturing of the optical transmission element according to the invention, the following dimensions can be expediently observed:

The back-twist of the supply reel VS should be selected between 90 and 99%.

The length of the lay of the helix should be selected to be at least 10 times its diameter and not more than 100 times its diameter. A particularly favorable length lies in the range of 20 to 50 times its diameter.

The diameter of the helix is favorable selected to be in range of 5 to 25 times the diameter of the light waveguide or respectively the diameter of the bundle of waveguides. For reasons of manipulation of the cable, one will be able to remain in the range of 5 through 15 mm stranding diameter for cladded light waveguides which have a diameter of between 0.25 and 1 mm.

The rate of feed $v_H$ in the production of the protective sheathing and the rate of feed $v_A$ in the haul-off of the light waveguide from the supply reel VS should be matched to one another in such a manner that, given the designations introduced above, the relationship is according to the following equation will occur:

$$\frac{v_A}{v_H} = \sqrt{1 + \left(\frac{\pi D}{H}\right)^2} \approx 1 + \frac{1}{2}\left(\frac{\pi D}{H}\right)^2 \tag{3}$$

Given the present invention, the controlled introduction of the excess length, for example, with a positionally controlled brake and retardant flow of the filler can be according to the teachings of the German patent application P No. 30 27 743.1 if desired.

It should be noted that when utilizing a plurality of waveguides, they can be loosely laid together as a bundle or they can be stranded into a cable-like bundle.

Although various minor modifications may be suggested by those versed in the art, it should be understood that I wish to embody within the scope of the patent granted hereon, all such modifications as reasonably and properly come within the scope of my contribution to the art.

I claim:

1. A method for manufacturing an elongated optical transmission element consisting of a tubular protective sheathing containing at least one fiber-like light waveguide having a form of a helix, said method comprising the steps of forming a tubular protective sheathing with an inside wall surface, subjecting each waveguide to an elastic pre-torsion to create a helix, and then maintaining the pre-torsion and inserting the waveguide into the sheathing so that the sheathing prevents the waveguide from unwinding and the elastic pre-torsion will cause the waveguide to press continuously against the inside wall surface of the sheathing and to spring out when the sheathing is cut.

2. A method according to claim 1, wherein the step of subjecting includes hauling off each of the waveguides from a supply reel with less than 100% back-twist.

3. A method according to claim 2, wherein said step of hauling-off the waveguide from the supply reel comprises an overhead haul-off of the waveguide from the supply reel for creating the pre-torsion.

4. A method according to claim 1, wherein the pre-torsion per length of lay of the helix amounts to at least the same fraction of the full rotation as the relative excess length of the light waveguide in the protective sheathing relates to the axial length of the element.

5. A method according to claim 1, wherein the length of lay of the helix is set to be at least 10 times the diameter of the helix and is not more than 100 times the diameter of the helix.

6. A method according to claim 5, wherein the length of the lay of the helix is in a range of 20 to 50 times the diameter of the helix.

7. A method according to claim 1, wherein at least two waveguides are subjecting, said step of introducing including providing the waveguides on separate haul-off reels, which are stationarily received in a common rotatable yoke, and hauling said waveguides from said reels while rotating said yoke.

8. A method according to claim 1, wherein a plurality of light waveguides are inserted and said step of subjecting comprises providing the plurality of waveguides on a common haul-off reel and hauling the waveguides from said common reel during the step of subjecting.

9. A method according to claim 1, wherein the step of subjecting comprises providing a supply reel with the light waveguides and drawing off the waveguides from said supply reel with a back-twist in the range of between 90 and 99%.

10. A method according to claim 1, wherein the diameter of the helix of the waveguide is selected to be in a range of between 5 and 25 times the diameter of the light waveguide.

11. A method according to claim 1, wherein more than one waveguide is inserted into the sheathing as a bundle of waveguides, and said helix of the bundle having a diameter selected to be in a range of 5 to 25 times the diameter of the bundles of waveguides.

12. A method according to claim 1, wherein the step of forming comprises extruding the sheathing and the steps of maintaining and inserting include providing a guide tube extending into the extruded sheathing, introducing the waveguide with the pre-torsion into the guide tube which guides the helically-shaped waveguide into the extruded sheathing.

13. A method according to claim 1, wherein a plurality at light waveguides are stranded to one another and said step of subjecting includes subjecting the stranded waveguides to an elastic pre-torsion to create a helix of the stranded waveguides.

14. A method according to claim 13, wherein the waveguides are stranded to one another with less than 100% back-twist.

* * * * *